US007552385B2

(12) United States Patent
Kreulen et al.

(10) Patent No.: US 7,552,385 B2
(45) Date of Patent: Jun. 23, 2009

(54) EFFICIENT STORAGE MECHANISM FOR REPRESENTING TERM OCCURRENCE IN UNSTRUCTURED TEXT DOCUMENTS

(75) Inventors: Jeffrey Thomas Kreulen, San Jose, CA (US); William Scott Spangler, San Martin, CA (US)

(73) Assignee: International Business Machines Coporation, Armonk, NY (US)

( * ) Notice: Subject to any disclaimer, the term of this patent is extended or adjusted under 35 U.S.C. 154(b) by 1876 days.

(21) Appl. No.: 09/848,430

(22) Filed: May 4, 2001

(65) Prior Publication Data

US 2002/0165884 A1 Nov. 7, 2002

(51) Int. Cl.
*G06F 17/00* (2006.01)
(52) U.S. Cl. .......................................... 715/255; 707/6
(58) Field of Classification Search ...................... 707/3, 707/5, 1, 6; 715/255
See application file for complete search history.

(56) References Cited

U.S. PATENT DOCUMENTS

| | | | | | |
|---|---|---|---|---|---|
| 5,488,725 | A | * | 1/1996 | Turtle et al. | 707/5 |
| 5,604,910 | A | * | 2/1997 | Kojima et al. | 707/3 |
| 5,748,953 | A | * | 5/1998 | Mizutani et al. | 707/6 |
| 5,818,877 | A | * | 10/1998 | Tsai et al. | 375/241 |
| 5,826,261 | A | * | 10/1998 | Spencer | 707/5 |
| 5,895,470 | A | * | 4/1999 | Pirolli et al. | 707/102 |
| 5,950,189 | A | * | 9/1999 | Cohen et al. | 707/3 |
| 5,974,412 | A | * | 10/1999 | Hazlehurst et al. | 707/3 |
| 6,167,368 | A | * | 12/2000 | Wacholder | 704/9 |
| 6,401,088 | B1 | * | 6/2002 | Jagadish et al. | 707/6 |
| 6,542,896 | B1 | * | 4/2003 | Gruenwald | 707/101 |
| 6,601,026 | B2 | * | 7/2003 | Appelt et al. | 704/9 |
| 6,633,868 | B1 | * | 10/2003 | Min et al. | 707/3 |
| 2002/0165707 | A1 | * | 11/2002 | Call | 704/2 |
| 2004/0049503 | A1 | * | 3/2004 | Modha et al. | 707/3 |

OTHER PUBLICATIONS

Buckley, Chris, et al, "Optimization of Inverted Vector Searches", Proceedings of the 8th Annual International ACM SIGIR Conference on Research and Development in Information Retrieval, Jun. 1985, pp. 97-110.*
Lee, Joon Ho, "Combining Multiple Evidence From Different Properties of Weighting Schemes", Proceedings of the 18th Annual International ACM SIGIR Conference on Research and Development in Information Retrieval, Jul. 1995, pp. 180-188.*
Viles, Charles L., et al, "On the Update of Term Weights in Dynamic Information Retrieval Systems", Proceedings of the Fourth International Conference on Information and Knowledge Management, Dec. 1995, pp. 167-174.*
Fagan, J., "Automatic Phrase Indexing for Document Retrieval", Proceedings of the 10th Annual International ACM SIGIR Conference on Research and Development in Information Retrieval, Nov. 1987, pp. 91-101.*
George McDaniel, IBM Dictionary of Computer, vii, viii, 212 (10th Ed. Aug. 1993).*

* cited by examiner

*Primary Examiner*—Laurie Ries
(74) *Attorney, Agent, or Firm*—McGinn IP Law Group, PLLC

(57) ABSTRACT

A method and structure converts a document corpus containing an ordered plurality of documents into a compact representation in memory of occurrence data, where the representation is to be based on a dictionary previously developed for the document corpus and where each term in the dictionary has associated therewith a corresponding unique integer. The method includes developing a first vector for the entire document corpus, the first vector being a sequential listing of the unique integers such that each document in the document corpus is sequentially represented in the listing according to the occurrence in the document of the corresponding dictionary terms. A second vector is also developed for the entire document corpus and indicates the location of each of the document's representation in the first vector.

21 Claims, 5 Drawing Sheets

DOC1: Hello, my name is Fred.
DOC2: Hello, my name is Scott.
DOC3: Scott says, "Live and let live."

FIG. 1
DOCUMENT CORPUS 1. name
2. fred
3. scott
4. Live

FIG. 2
DICTIONARY

```
1 1 0 0
1 0 1 0
0 0 1 2
```

(Space required:
16 short ints at 2 bytes each = 32 bytes)

FIG. 3
DENSE MATRIX - INTEGER FORMAT
(PRIOR ART)

```
0.707  0.707  0.0    0.0
0.707  0.0    0.707  0.0
0.0    0.0    0.477  0.894
```

(Space required:
12 floats at 4 bytes each
= 48 bytes)

(Note: $0.707 = 1*1/(1^2 + 1^2)^{1/2}$; $0.477 = 1*1/(1^2 + 2^2)^{1/2}$; $0.894 = 2*1/(1^2 + 2^2)^{1/2}$)

FIG. 4
DENSE MATRIX - FLOATING POINT NUMBER FORMAT
(PRIOR ART)

(1 0.707) (2 0.707)
(1 0.707) (3 0.707)
(3 0.477) (4 0.894)

(Space required:
6 short ints & 6 floats
= 6 * 2 + 6 * 4 = 36 bytes)

FIG. 5
SPARSE MATRIX - FLOATING POINT NUMBER FORMAT
(PRIOR ART)

1, 2: 0.707
1, 3: 0.707
3, 4, 4: 0.447

(Note: $0.707 = 1*1/(1^2 + 1^2)^{1/2}$; $0.477 = 1*1/(1^2 + 2^2)^{1/2}$)

(Space required:
7 short ints & 3 floats
$= 7*2 + 3*4 = \underline{26 \text{ bytes}}$)

FIG. 6
*SMALL SPARSE MATRIX - FLOATING POINT NUMBER FORMAT*

ALLDATA = 1 2 1 3 3 4 4
STARTMARKER = 1, 3, 5
MULT = 0.707 0.707 0.447

FIG. 7
*SMALL SPARSE MATRIX IN VECTOR FORM*

EFFICIENT STORAGE MECHANISM FOR REPRESENTING TERM OCCURRENCE IN UNSTRUCTURED TEXT DOCUMENTS

BACKGROUND OF THE INVENTION

1. Field of the Invention

The present invention generally relates to a conversion and storage technique for representing occurrences of dictionary terms in a document corpus including unstructured text documents. This representation in random access memory (RAM) would typically be used in data mining of the document corpus. Specifically, the invention provides a small sparse matrix considerably smaller than the conventional sparse matrix and dense matrix representations.

2. Description of the Related Art

Free form computer helpdesk data sets consist primarily of short text descriptions, composed by the helpdesk operator for the purpose of summarizing what problem a user had and what was done by the helpdesk operator to solve that problem. A typical text document (known as a problem ticket) from this data set consists of a series of exchanges between an end user and an expert helpdesk advisor, for example:

1836853 User calling in with WORD BASIC error when opening files in word. Had user delete NORMAL.DOT and had her reenter Word. she was fine at that point. 00:04:17 ducar May 2"07"05"656PM Problem tickets may have only a single symptom and resolution pair as in the above example, or they may span multiple questions, symptoms, answers, attempted fixes, and resolutions—all pertaining to the same basic issue. Problem tickets are opened when the user makes the first call to the helpdesk and closed when all user problems documented in the first call are finally resolved in some way. Helpdesk operators enter problem tickets directly into the database. Spelling, grammar and punctuation are inconsistent. The style is terse and the vocabulary very specialized. Note also that each keyword is used only once or very few times.

One potential benefit to be gained from helpdesk data sets is to "mine" them to discover general categories of problems. Once a meaningful "problem categorization" has been discovered, individual categories can be studied to find automated solutions to address future user problems in this area. A typical example of such a solution would be an entry in a "Frequently Asked Questions" section of a customer support web site.

Unfortunately, it is very difficult to categorize large amounts of unstructured text information by hand. Automated methods, such as text clustering, provide a means for computers to quickly create categorizations from unstructured text with little or no intervention from the human expert. Typically text clustering algorithms work by categorizing documents hased on term occurrence, where a "term" is a word or phrase contained in a "dictionary" of commonly occurring and meaningful words and phrases.

To work effectively on large data sets in a short time, such algorithms need a representation of the text corpus that can reside in computer memory (RAM). This representation must indicate for each document in the text corpus the number of times each dictionary term occurs in that document. The size in memory of this matrix is typically the limiting factor which determines how large a text corpus may be categorized in a given computer hardware configuration.

To illustrate the various storage representations of a document corpus, FIG. 1 shows a document corpus having three documents. FIG. 2 shows one possible dictionary developed from this same document corpus. FIG. 3 shows a basic representation of the document corpus using a dense matrix. In effect, one axis of the matrix contains an ordered listing of all dictionary terms and the second axis contains an ordered listing of the documents in the corpus. The matrix is then filled with number of occurrences of each dictionary term in each document, and each document can be considered to represent a vector in dictionary space.

FIG. 4 shows the floating point format of the same dense matrix (e.g., the preferred format for data mining algorithms). This floating point format represents the same information as the integer format but each document is now "normalized-"into unit vectors, thereby eliminating the effect of document length. As can be easily seen, each floating point number is the integer value multiplied by the reciprocal of the square root of the summation of integer values squared, the well known process of normalizing a vector, where the vector is considered as a matrix row. If the document corpus contains a large number of short documents and the dictionary contains a large number of terms, then it is easy to see that the dense matrix representation would be filled mostly with zeroes since any row representing a document would contain only a few of the many dictionary terms. The matrix in FIG. 4 takes 48 bytes in RAM, assuming a short integer takes two bytes and a floating point number takes four bytes.

In order to conserve space, a sparse matrix representation is usually employed. Such a representation indicates the position and value of each non-zero matrix element. A floating point example is shown in FIG. 5. This matrix is developed by first assigning a unique integer for each dictionary term and then filling in the unique integer corresponding to document words (see FIG. 2). Associated with each document word is a normalization factor, calculated identically to that explained for the dense matrix. The matrix in FIG. 5 would occupy 36 bytes in RAM.

Although the sparse matrix representation of a document corpus provides an improvement in memory requirement over that of the dense matrix, it carries an overhead cost of storing the normalization factor for each term and of keeping track of each separate document. Thus, there remains a need to present document corpus occurrence data in a format that further reduces the RAM requirement.

SUMMARY OF THE INVENTION

In view of the foregoing and other problems, disadvantages, and drawbacks of the conventional dense matrix and the conventional sparse matrix, the present invention has been devised, and it is an object of the present invention to provide a structure and method for reducing the storage size of a document corpus.

It is also an object of the present invention to provide a method for the smallest known representation of occurrence data for a document corpus.

It is also an object of the present invention to provide a technique in which a large document corpus containing a very large number of relatively short documents can be mined for data, using a predeveloped dictionary of document terms.

It is also an object of the present invention to provide a small sparse matrix in which a document corpus is represented as a single vector in memory in which dictionary terms appear as integers each corresponding to a dictionary term.

It is also an object of the present invention to provide a technique in which a small sparse matrix can be further modified so that information is available as floating point numbers more commonly used in data mining algorithms rather than integers.

In order to attain the object(s) suggested above, there is provided, according to one aspect of the invention, a method to convert a document corpus containing an ordered plurality of documents into a compact representation in memory of occurrence data, where the representation to be based on a dictionary previously developed for the document corpus and wherein each term in the dictionary has associated therewith a corresponding unique integer, the method including developing a first vector for the entire document corpus, this first vector being a sequential listing of the unique integers such that each document in the document corpus is sequentially represented in the listing according to the occurrence in the document of the corresponding dictionary terms and developing a second vector for the entire document corpus, where the second vector indicates the location of each of the document's representation in the first vector.

According to another aspect of the invention, a method is disclosed to convert, organize and represent in a computer memory a document corpus containing an ordered plurality of documents, for use by a data mining applications program requiring occurrence-of-terms data, where the representation is to be based on terms in a dictionary previously developed for the document corpus and wherein each term in the dictionary has associated therewith a corresponding unique integer, the method including, for the document corpus, taking in sequence each ordered document and developing a first uninterrupted listing of the unique integers to correspond to the occurrence of the dictionary terms in the document corpus and developing a second uninterrupted listing for the entire document corpus, containing in sequence the location of each corresponding document in the first uninterrupted listing, wherein the first listing and the second listing are provided as input data for the data mining applications program.

According to another aspect of the invention, an apparatus is provided to organize and represent in a computer memory a document corpus containing an ordered plurality of documents, for use by a data mining applications program requiring occurrence-of-terms data, where the representation is to be based on terms in a dictionary previously developed for the document corpus and wherein each term in the dictionary has associated therewith a corresponding unique integer. The apparatus includes an integer determiner receiving in sequence each ordered document of the document corpus and developing a first uninterrupted listing of the unique integers to correspond to the occurrence of the dictionary terms in the document corpus and a locator developing a second uninterrupted listing for the entire document corpus containing in sequence the location of each corresponding document in the first uninterrupted listing, wherein the first listing and the second listing are provided as input data for the data mining applications program.

According to another aspect of the invention, a signal-bearing medium is provided which tangibly embodies a program of machine-readable instructions executable by a digital processing apparatus to perform the method described above.

According to another aspect of the invention, a data converter is provided which organizes and represents in a computer memory a document corpus containing an ordered plurality of documents, for use by a data mining applications program requiring occurrence-of-terms data, where the representation is to be based on terms in a dictionary previously developed for the document corpus and wherein each term in the dictionary has associated therewith a corresponding unique integer, including a unit to develop a first uninterrupted listing of the unique integers to correspond to the occurrence of the dictionary terms in the document corpus and a unit to develop a second uninterrupted listing for the entire document corpus containing in sequence the location of each corresponding document in the first uninterrupted listing, wherein the first listing and the second listing are provided as input data for the data mining applications program.

This invention further reduces the RAM requirement for a document corpus by representing the occurrence data in a small sparse matrix. This small sparse matrix representation, while perhaps not the smallest possible storage scheme for such information, is believed to be the smallest possible that does not incur a significant performance penalty during data retrieval.

The exemplary type of document database addressed by the present invention is a document corpus that includes many documents, where each document is relatively short and in which each document uses specific keywords or significant terms only once or only a very limited number of times. A separately-developed dictionary contains the keywords or significant terms for all documents in the document corpus. The type of document corpus which benefits particularly from the invention is the helpdesk example that follows. Another example would be a document corpus consisting of patent or other technical abstracts or even a series of document retrieved from the Internet.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 1 shows a very simple document corpus containing three short documents;

FIG. 2 shows a possible dictionary for the document corpus;

FIG. 3 shows a dense matrix for the document corpus using an integer format;

FIG. 4 shows the dense matrix in a floating point format;

FIG. 5 shows a floating point sparse matrix for the document corpus;

FIG. 6 shows one embodiment of the present invention in which the document corpus is represented in the floating point format of a small sparse matrix;

FIG. 7 shows a flowchart of a preferred method of the invention;

DETAILED DESCRIPTION OF PREFERRED EMBODIMENTS OF THE INVENTION

Referring now to FIGS. 6 through 9, there is shown a preferred embodiment of the method according to the present invention. FIG. 6 shows the example document corpus in the small sparse matrix of the present invention. Similar to the sparse matrix of FIG. 5, the small sparse matrix lists for all documents the unique integers associated with dictionary terms occurring in the document. However, the representation in the small sparse matrix differs in two aspects. First, each multiple occurrence of a term appears. Second, the normalization factor is a single floating number for the entire document rather than a factor for each dictionary term.

With this understanding of the information content of the small sparse matrix, FIG. 7 shows how the example document corpus from FIG. 1 would appear in RAM using an exemplary preferred method of the invention. From FIG. 7, it can be seen that the unique integers representing dictionary terms appears as a single vector ALLDATA for the entire document corpus. The document data appears in the ALLDATA vector according to the order the document appears in the corpus. To identify document location in the ALLDATA data, a listing of document starting points is listed in a second vector STATMARKER. Finally, if floating point representation is required, then a third vector MULTS contains a listing of document normalization factors so that each document has listed its normalization factor.

Figure 8:
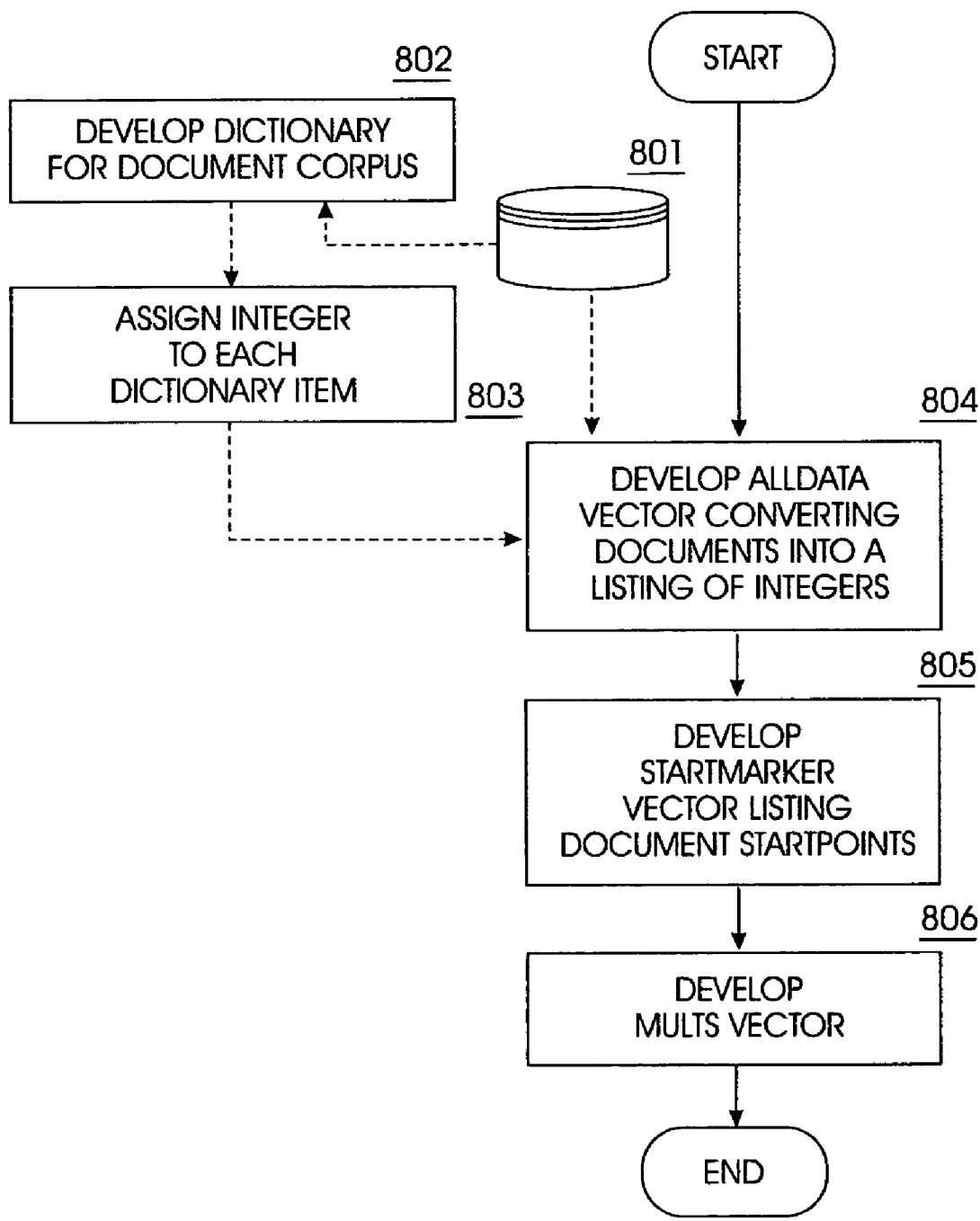
FIG. 8 shows a flowchart of steps in developing the ALLDATA, STARTMARKER, and MULTS vectors.

FIG. 8 shows the flowchart of the basic technique in developing a small sparse matrix. A corpus of ordered documents is presumed. That is, a database 801 exists containing a number of documents, each document being identifiable by, for example, a document number. The development (step 802) of a dictionary for the document corpus, comprising a listing of significant words contained in all documents, is also presumed for this invention. Various algorithms for dictionary development are known in the art. This invention is concerned only with the end product of the dictionary development and not with details of how the dictionary development. Also presumed is a corresponding preassigned unique integer (step 803) for each dictionary term.

A small sparse matrix is developed by converting (step 804) each document sequentially into a format expressed in these unique integers. Specifically, the entire corpus is recorded in memory as a single vector ALLDATA, including a sequential representation of the ordered documents in the corpus, each document being represented as a sequence of the unique integers that define the contents of the document as expressed in the corresponding dictionary terms.

For example, if the first integer in ALLDATA is X, then this indicates that the term represented by X occurs in the first document. If that same term occurs more than once in the first document, then it would be listed once per occurrence. Typically, the contents of each document would then be sorted so that all occurrences of X would be listed together in that document's representation.

The STARTMARKERS vector is concurrently developed (step 805) to define the boundary of each document in ALLDATA. STARTMARKERS will have as many entries as there are documents in the corpus, plus one extra entry to mark the end of the ALLDATA vector.

The conversion into floating point format (step 806) preferred by many data mining algorithms is the same as previously discussed. One possible mechanism for normalization includes developing a third vector MULTS containing for each document the corresponding floating point multiplier for each corresponding document. The basic technique for calculating the document floating point multiplier is similar to that described above. The difference is that MULTS contains a single multiplier for each document. The data mining application will then count the number of occurrences and multiply by the multiplier for each term in the document.

Figure 9:
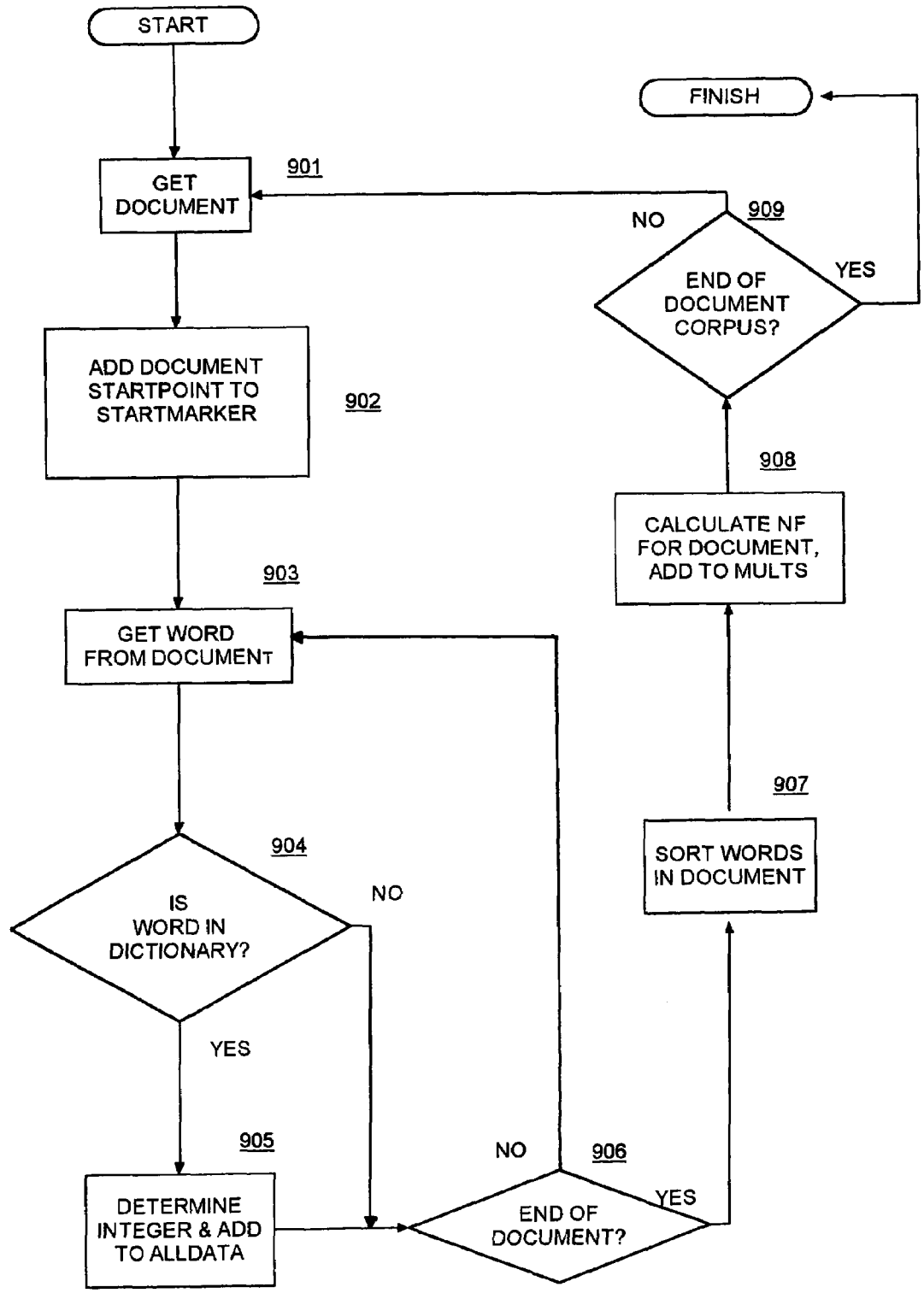
FIG. 9 shows the resultant example document corpus representation in format of the ALLDATA, STARTMARKERS, and MULTS vectors.

FIG. 9 shows a flowchart for developing ALLDATA, STARTMARKERS, and MULTS. Each document is in sequence retrieved (step 901) from the document corpus and the starting point for the document is added (step 902) to STARTMARKER. Each word in the document is analyzed (step 903) to determine (step 904) whether that word is a dictionary term.

If so, then the corresponding unique integer is added (step 905) to ALLDATA, if not, then the word is ignored. A determination is made as to whether all words in the document have been considered (step 906). If not, the next word is analyzed.

Having arrived at the final word of the document the ALLDATA entries for that document are optionally sorted (step 907) to rearrange any repetitous terms to be adjacent and the document normalization factor is calculated (step 908) and added to MULTS.

As demonstrated in FIG. 6, the document normalization factor normalizes the document considered as a vector comprised of dictionary terms. Each dictionary term appearing in a document is considered a dimension of that vector. Repetitions of any term are considered to increase by one the term occurrence, as demonstrated in the entry for DOC3 in FIG. 6. Thus, the normalization factor is calculated as $NF=1/(\Sigma x_1^2)^{1/2}$, where $x_1$ is the number of occurrences of a specific term in said document, so that NF represents the reciprocal of the square root of the sum of squares of all term occurrences in said document.

This basic cycle is repeated (step 909) until all documents have been processed.

Figure 10:
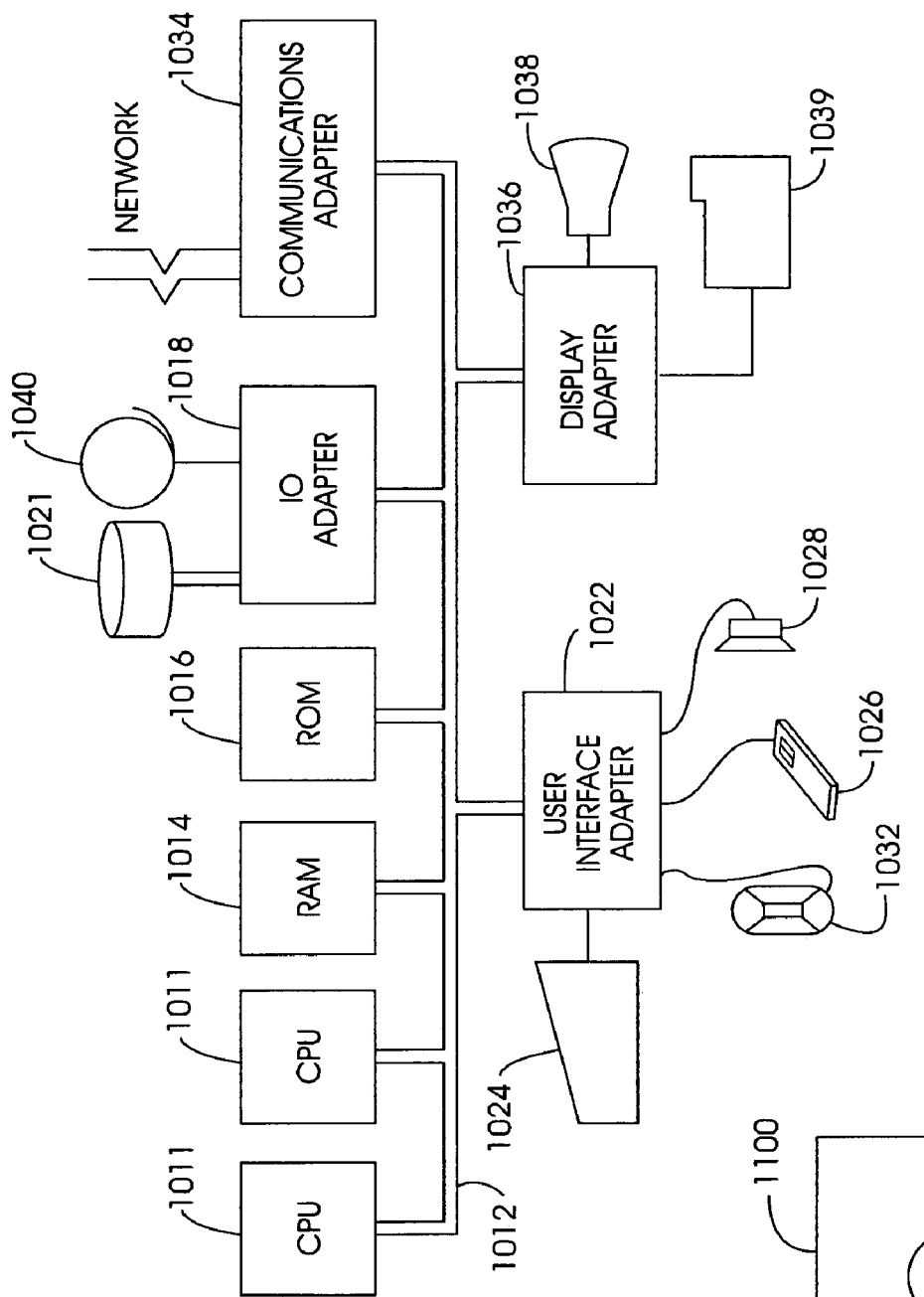
FIG. 10 illustrates an exemplary hardware/information handling system 1000 for incorporating the present invention therein.

FIG. 10 illustrates a typical hardware configuration of an information handling/computer system in accordance with the invention and which preferably has at least one processor or central processing unit (CPU) 1011.

The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1011 and hardware above, to perform the method of the invention.

Figure 11:
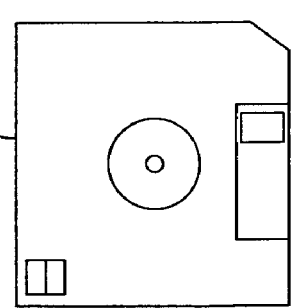
FIG. 11 illustrates a signal bearing medium 1100 (e.g., storage medium) for storing steps of a program of a method according to the present invention.

This signal-bearing media may include, for example, a RAM contained within the CPU 1011, as represented by the fast-access storage for example. Alternatively, the instructions may be contained in another signal-bearing media, such as a magnetic data storage diskette 1100 (FIG. 11), directly or indirectly accessible by the CPU 1011.

Whether contained in the diskette 1100, the computer/CPU 1011, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

The small sparse matrix is most beneficial when the corpus includes a large number of very short documents, such as that of the helpdesk document corpus. Since the entire corpus is represented as a single vector, the only memory overhead required to identify, separate, and locate each individual document is the STARTMARKERS vector. The small sparse matrix representation of the document corpus does not require a dedicated section of memory typically used to track and maintain discrete documents in a corpus. As a typical example, the invention becomes particularly advantageous when the corpus includes a million or more documents, the dictionary contains less than 32,000 terms, and each document contains less than a thousand words and has only one occurrence or a small number of occurrences of dictionary terms.

The approach according to a preferred embodiment of the present invention may be applied to any situation where a large corpus of unstructured text documents needs to be indexed against an existing term dictionary in an efficient manner. The World Wide Web is one example of such a corpus.

Past approaches to representing term occurrence in document information have relied on multi-dimensional arrays or on conventional sparse matrix representations. Compared to these methods the approach of the invention reduces the required memory needed to maintain such a representation by an order of magnitude.

While the invention has been described in terms of preferred embodiments, those skilled in the art will recognize that the invention can be practiced with modification within the spirit and scope of the appended claims.

What is claimed is:

1. A method of converting a document corpus containing an ordered plurality of documents into a compact representation in memory of occurrence data, said method comprising:
   developing a first vector for said entire document corpus, said first vector being a listing of integers corresponding to terms in said documents such that each said document in said document corpus is sequentially represented in said listing; and
   developing a second vector for said entire document corpus, said second vector indicating the location of each said document's representation in said first vector.

2. The method of claim 1, further comprising:
   developing a third vector for said entire document corpus, said third vector comprising a sequential listing of floating point multipliers, each said floating point multiplier representing a document normalization factor.

3. The method of claim 2, wherein said normalization factor is calculated as:
   $NF = 1/(S x_i^2)^{1/2}$, where $x_i$ is the number of occurrences of a specific term in said document, so that NF represents the reciprocal of the square root of the sum of squares of all term occurrences in said document.

4. The method of claim 1, further comprising:
   rearranging, in said first vector, an order of said unique integers within the data for each said document so that all identical unique integers are adjacent.

5. The method of claim 1, further comprising:
   developing a dictionary comprising said terms contained in said document corpus; and
   associating, with each said dictionary term, an integer to be uniquely corresponding to said dictionary term, said uniquely corresponding integers being said integers comprising said first vector.

6. A method of converting, organizing, and representing in a computer memory a document corpus containing an ordered plurality of documents, said method comprising:
   for said document corpus, taking in sequence each said ordered document and developing a first uninterrupted listing of integers to correspond to an occurrence of terms in the document corpus; and
   developing a second uninterrupted listing for said entire document corpus, said second uninterrupted listing containing, in sequence, the location of each corresponding document in said first uninterrupted listing.

7. The method of claim 6, further comprising:
   developing a third uninterrupted listing for said entire document corpus, said third uninterrupted listing containing a sequential listing of floating point multipliers, each said floating point multiplier representing a document normalization factor for a corresponding document in said document corpus.

8. The method of claim 7, wherein said normalization factor is calculated as:
   $NF = 1/(S x_i^2)^{1/2}$, where $x_i$ is the number of occurrences of a specific term in said document, so that NF represents the reciprocal of the square root of the sum of squares of all term occurrences in said document.

9. The method of claim 6, further comprising:
   for each said document in said document corpus, rearranging said unique integers so that any identical integers are adjacent.

10. The method of claim 6, further comprising:
    developing a dictionary comprising terms contained in said document corpus; and
    associating, with each said dictionary term, an integer to be uniquely corresponding to said dictionary term, said uniquely corresponding integers used in said first uninterrupted listing.

11. An apparatus for organizing and representing in a computer memory a document corpus containing an ordered plurality of documents, said apparatus comprising:
    an integer determining module receiving in sequence each said ordered document of said document corpus and developing a first uninterrupted listing of unique integers to correspond to an occurrence of terms in the document corpus; and
    a locator module developing a second uninterrupted listing for said entire document corpus, said second uninterrupted listing containing, in sequence, the location of each corresponding document in said first uninterrupted listing.

12. The apparatus of claim 11, further comprising:
    a normalizer developing a third uninterrupted listing for said entire document corpus, containing a sequential listing of floating point multipliers, each said floating point multiplier representing a document normalization factor for a corresponding document in said document corpus.

13. The apparatus of claim 12, wherein said normalizer calculates said normalization factor as:

$NF = 1/(S\, x_i^2)^{1/2}$, where $x_i$ is the number of occurrences of a specific term in said document, so that NF represents the reciprocal of the square root of the sum of squares of all term occurrences in said document.

14. The apparatus of claim 11, further comprising: a rearranger rearranging said unique integers so that any identical integers for each said document in said document corpus are adjacent.

15. The apparatus of claim 11, further comprising:

a dictionary developing module to develop a dictionary of terms contained in said document corpus, each said term being associated with a corresponding unique integer.

16. A signal-bearing storage medium tangibly embodying a program of machine-readable instructions executable by a digital processing apparatus to perform a method to organize and represent in a computer memory a document corpus containing an ordered plurality of documents, said method comprising:

developing a first uninterrupted listing of unique integers to correspond to the occurrence of terms in the document corpus; and developing a second uninterrupted listing for said entire document corpus, said second uninterrupted listing containing, in sequence, the location of each corresponding document in said first uninterrupted listing.

17. The signal-bearing storage medium of claim 16, wherein said method further comprises:

developing a third uninterrupted listing for said entire document corpus, containing a sequential listing of floating point multipliers, each said floating point multiplier representing a document normalization factor for a corresponding document in said document corpus.

18. The signal-bearing storage medium of claim 16, wherein said method further comprises:

developing a dictionary comprising terms contained in said document corpus; and associating, with each said dictionary term, an integer to be uniquely corresponding to said dictionary term, said uniquely corresponding integers used in said first uninterrupted listing.

19. A data converter for organizing and representing in a computer memory a document corpus containing an ordered plurality of documents, for use by a data mining applications program requiring occurrence-of-terms data, said representation to be based on terms in a dictionary developed for said document corpus and wherein each said term in said dictionary has associated therewith a corresponding unique integer, said data converter comprising:

means for developing a first uninterrupted listing of said unique integers to correspond to the occurrence of dictionary terms in the document corpus and; and means for developing a second uninterrupted listing for said entire document corpus containing in sequence the location of each corresponding document in said first uninterrupted listing, wherein said first listing and said second listing are provided as input data for said data mining applications program.

20. The data converter of claim 19, further comprising:

means for developing a third uninterrupted listing for said entire document corpus, containing a sequential listing of floating point multipliers, each said floating point multiplier representing a document normalization factor for a corresponding document in said document corpus.

21. The data converter of claim 19, further comprising:

means for rearranging said unique integers so that any identical integers for each said document in said document corpus are adjacent.

* * * * *